(12) United States Patent
Moll et al.

(10) Patent No.: US 7,133,670 B1
(45) Date of Patent: Nov. 7, 2006

(54) ROAMING AGREEMENT APPLICATION AND DATABASE FOR CARRYING OUT ROAMING BETWEEN PRIVATE AND PUBLIC WIRELESS NETWORKS

(75) Inventors: Keith Moll, Olathe, KS (US); Khaled Al-Khashti, Overland Park, KS (US); Brent Burpee, Olathe, KS (US); Jesse Grindeland, Olathe, KS (US); Scott Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 219 days.

(21) Appl. No.: 10/748,599

(22) Filed: Dec. 29, 2003

(51) Int. Cl.
*H04Q 7/20* (2006.01)
(52) U.S. Cl. .............. 455/432.1; 455/432.3; 455/436; 455/445; 370/494
(58) Field of Classification Search ............ 455/422.1, 455/432.1, 432.2, 432.3, 436, 444, 414.1, 455/445, 433, 434, 552.1; 370/493–495
See application file for complete search history.

(56) References Cited

U.S. PATENT DOCUMENTS

| | | | |
|---|---|---|---|
| 5,737,703 A | 4/1998 | Byrne | |
| 6,438,117 B1 | 8/2002 | Grilli et al. | |
| 6,539,237 B1* | 3/2003 | Sayers et al. | 455/555 |
| 6,680,923 B1 | 1/2004 | Leon | |
| 6,687,243 B1* | 2/2004 | Sayers et al. | 370/356 |
| 6,697,620 B1* | 2/2004 | Lamb et al. | 455/432.1 |
| 2001/0036830 A1 | 11/2001 | Wu et al. | |
| 2001/0046860 A1* | 11/2001 | Lee | 455/426 |
| 2002/0061766 A1* | 5/2002 | Sato et al. | 455/552 |
| 2003/0091021 A1 | 5/2003 | Trossen et al. | |
| 2003/0100303 A1* | 5/2003 | Armbruster et al. | 455/433 |
| 2004/0203890 A1* | 10/2004 | Karaoguz et al. | 455/456.1 |
| 2004/0242208 A1* | 12/2004 | Teicher | 455/414.1 |
| 2005/0059400 A1* | 3/2005 | Jagadeesan et al. | 455/436 |

* cited by examiner

*Primary Examiner*—Joseph Feild
*Assistant Examiner*—Jaime M. Holliday (57) ABSTRACT

A method and system for providing telecommunication services to a mobile-subscriber terminal roaming between private and public-wireless networks is disclosed. After roaming from the public-wireless network into the private-wireless network, for example, an entity in the private-wireless network executes an application that retrieves from a roaming-agreement database roaming-agreement information for operating the mobile-subscriber terminal in the private-wireless network. Using this information as an input, the application may determine one or more roaming rules for operating in the private-wireless network.

37 Claims, 8 Drawing Sheets

ROAMING AGREEMENT APPLICATION AND DATABASE FOR CARRYING OUT ROAMING BETWEEN PRIVATE AND PUBLIC WIRELESS NETWORKS

RELATED APPLICATIONS

The present application is related to U.S. patent application Ser. No. 10/161,313, filed Jun. 3, 2002, entitled "Method and System for Intersystem Wireless Communication Session Hand-Off," which is assigned to the same assignee as the present application, and which is fully incorporated herein by reference.

BACKGROUND

1. Field of the Invention

The following relates in general to computer networks, and more particularly, to providing services in wireless telecommunication networks. The following is particularly useful for determining roaming rules for a mobile-subscriber terminal when the mobile-subscriber terminal roams into a private-wireless network from a public-wireless network, and vice-versa.

2. Description of Related Art

Public-wireline telecommunications carriers typically provide to their subscribers telecommunications and other networking services (collectively "services") based, in a large part, on a particular geographical coverage area in which the subscriber resides or otherwise plans to operate. For example, a resident of municipality "A" may subscribe to public wireline carrier "A," whereas a resident of another municipality may subscribe to public wireline carrier "B." Consequently, a subscriber of carrier A cannot move to a coverage area of a foreign carrier, such as carrier B, and continue to receive services without changing their subscription to the foreign carrier. In other words, the subscribers of public wireline networks cannot roam.

On the other hand, a subscriber of a public-wireless and/or a satellite network (collectively referred to as a "public-wireless network") may not only receive the services when operating in the coverage area of their subscribed-to network, but also when roaming in the coverage area of a foreign carrier's public-wireless network. To facilitate roaming, the carriers of the subscribed-to and foreign networks public-wireless networks normally negotiate roaming agreements. This is in addition to providing the technological requirements carry out supplying services to roaming mobile-subscriber terminals.

Such roaming agreements are particularly advantageous to the carriers of both the subscribed-to and foreign networks because the coverage area is based primarily on geographically-restrictive, governmentally-granted licenses for wireless spectrum. Thus, the roaming agreements allow the carriers of the subscribed-to and foreign networks to provide to their subscribers extended coverage areas, which can range from a small municipality to an entire country or even to a plurality of countries.

When the public-wireless networks are integrated with public wired networks, the combined networks provide domestic along with international coverage. Thus, the combined networks may include portions of a Public Switch Telephone Network (PSTN), the Internet, core and proprietary public networks, and/or wireless voice and packet-data networks (e.g., 1G, 2G, 2.5G and 3G telecommunication networks).

For many years, not only have businesses, Small Office/Home Office (SOHO) entities, and other organizations (collectively referred to herein as "enterprises"), but also private individuals have been using private telecommunications networks. Typically, these private networks terminate to public-wireline networks, but are not under the control of the carriers of the public-wireline networks. Advantageously, then, private networks provide the enterprises and private individuals with greater control over the network, which in turn allows customization of the services provided to the network's users and/or subscribers.

For example, many enterprises and private individuals have private-wireline-switching systems, such as private branch exchanges (PBXs) and/or media gateways. These private-wireline-switching systems manage communications (i) internally, i.e., among the subscribers of the private network, and (ii) externally, i.e., between the subscribers of the private network and subscribers of the public wireline or wireless networks. With the ability to manage internal communication free from the public-wireless and/or wireline networks, the private-wireline-switching systems can offer enhanced services such as call forwarding, caller id, etc., to its internal subscribers.

Recent advances in computer data networks, such as the ability to provide Voice-over-Packet communications, have provided the impetus for delivering telecommunication services over local area networks. Enterprises and private individuals are increasingly deploying private-wireless networks, such as wireless local area networks (WLANs). These WLANs may be deployed as stand-alone networks. Alternatively, the WLANs may be coupled to private-wireline-switching systems to connect to the public wireline networks.

Unlike the licensed spectrum used in public-wireless networks, WLANs in the United States have been and are being deployed using freely-available, allocated frequencies provided by the Unlicensed National Information Infrastructure (U-NII). Other countries have similar governmental grants for unlicensed frequencies.

Consequently, the WLANs have developed independent of the geographical restrictions normally associated with the licensed wireless spectrum. However, due to (governmentally-imposed and technological) power limitations, the coverage areas of such private networks are typically geographically limited. These geographically-limited coverage areas are commonly referred to as "hotspots."

The coverage area of a hotspot may be, for example, a single building, a part of a building, or a complex of buildings and campuses, though, typically, such coverage does not cover large contiguous areas. The recently promulgated IEEE 802.11 standard defines a standard protocol for using frequencies allocated by the Unlicensed National Information Infrastructure (U-NII). Under various sections of the standard, the maximum coverage area for a given power and frequency range is defined. For example, a wireless access point conforming to IEEE 802.11b may be limited to providing coverage within a 150 foot radius, whereas a wireless access point conforming to IEEE 802.11g may be limited to providing coverage within a 175 foot radius.

Theoretically, wireless access points may be "daisy-chained" together through a wireline backbone, such as an intranet. Although a single wireless access point can be fairly inexpensive, providing enough wireless access points to cover large contiguous coverage areas and the corresponding infrastructure to support the wireless access points can be substantially expensive and difficult to implement.

Consequently, private-wireless networks are generally not integral to or integrated with other private and public-wireless networks. Even if the private-wireless network is coupled to such other private and public-wireless networks, any external communications are carried out according to rules set-up by the carriers of the other networks. Thus, neither the private-wireless carriers nor the public-wireless carriers currently offer services to their respective subscribers in the others' networks.

Consider, for instance, call forwarding services for a subscriber of a public-wireline network and a public-wireless network. When using the call forwarding services, calls placed to the user's work phone may be forwarded to the user's mobile-subscriber terminal. While this service is useful when the user is in the coverage range of the public-wireless network, it may not work when the user is far from the office and out of the coverage area of the public-wireless network. Thus, a user may be unable to receive important calls when operating outside the coverage area of a public-wireless network even though the user is within the coverage area of a private-wireless network.

One way to overcome this situation is to have a user independently subscribe to the public-wireless network and all the private-wireless networks that cover the area he or she plans to use. In many cases, subscribing to all these networks may require the user to have separate subscriber accounts, separate sets of services, separate mobile-subscriber stations (or a single multiple-technology terminal), and separate mobile-subscriber-station identifiers. Thus, this approach may be impractical. Even if implemented, the user may have certain services available only when operating in the public-wireless network that are not available when operating in the private-wireless networks.

Furthermore, with the abundance of inexpensive WLAN equipment and without the ability to keep others from using the spectrum (and deriving profits therefrom), the public-wireless network carriers historically have been reluctant to invest resources into WLANs. Coupling this with the technological differences between the architectures of the private-wireless and public-wireless networks, the carriers of the public-wireless and private-wireless networks have not generally entered into roaming agreements.

The lack of roaming agreements has prevented integration or harmonization of methods and systems for facilitating roaming between the public-wireless and private-wireless networks. But with the growing number of private-wireless networks and the subscribers' desires for coverage no matter where they are operating, there is a need to facilitate roaming between the public-wireless and private-wireless networks.

SUMMARY

A method and system for providing telecommunication services to a mobile subscriber terminal roaming from a public-wireless network into a private-wireless network is disclosed. The method may include the mobile subscriber terminal roaming into a private-wireless network from a public-wireless network to which it subscribes. Roaming-agreement information for the mobile-subscriber terminal may be retrieved from a roaming-agreement database. Form the roaming agreement information, roaming rules for operating the mobile-subscriber terminal in the private-wireless network may be determined. Thereafter, the private wireless network provides services to the mobile-subscriber terminal in accordance with the roaming rules.

BRIEF DESCRIPTION OF THE DRAWINGS

Presently preferred embodiments of the invention are described below in conjunction with the appended Figures, wherein like reference numerals refer to like elements in the various Figures, and wherein.

DETAILED DESCRIPTION OF EXEMPLARY EMBODIMENTS

1. Exemplary Architecture

Figure 1:
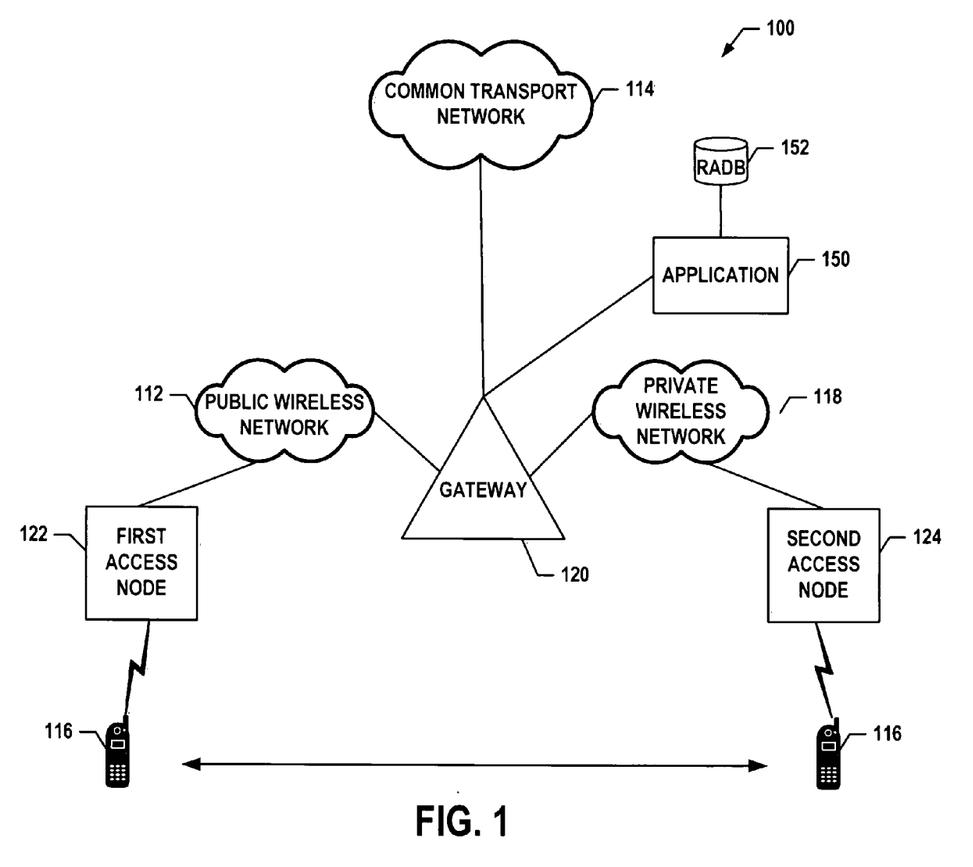
FIG. 1 is a first block diagram depicting a common-gateway architecture for carrying out roaming-rule-decision making in accordance with an exemplary embodiment.

Referring to the drawings, FIG. 1 generally depicts a "common-gateway" architecture 100 for carrying out roaming-rule-decision making in accordance with an exemplary embodiment. As shown in FIG. 1, the common-gateway architecture 100 includes a common transport network 114 coupled to a common gateway 120. The common gateway 120 in turn is coupled to a public-wireless network 112 and a private-wireless network 118. These networks have respective public-wireless and private-wireless access nodes 122, 124 to which a mobile-subscriber terminal 116 may communicate. The common-gateway architecture 100 may also include an application 150 and roaming-agreement database 152 for carry out roaming-rule-decision making for the mobile-subscriber terminal 116 when roaming from the public-wireless network to the private-wireless network, and vice-versa.

The mobile-subscriber terminal 116 may be a mobile phone, laptop computer, personal digital assistant, and other communicating device. The mobile-subscriber terminal 116 may be a multimode device to support different communication protocols and formats. This allows the mobile-subscriber terminal 116 to carry on communications in different networks having dissimilar protocols and formats. As described in more detail below, the mobile station 116 may be deployed to roam between networks having differing communication protocols and formats.

The mobile-subscriber terminal 116 may also have a "home" network in which a centralized repository of information about the mobile-subscriber terminal 116 is maintained. This central repository may contain a service profile that includes preference information for the mobile-subscriber terminal, the last reported location of the mobile-subscriber terminal, and the current status of the mobile-subscriber terminal, such as whether it is active or inactive. The service profile may also indicate any enhanced services, such as call forwarding, to which the mobile-subscriber terminal 116 may subscribe.

If, for example, the home network of mobile-subscriber terminal 116 is the public-wireless network 112, then the service profile may be downloaded into a visitor record (not shown) in the private-wireless network 118 upon registration in the private-wireless network 118. Similarly, when the mobile-subscriber terminal 116 home network is the private-wireless network 118, then the service profile may be downloaded into a visitor record (not shown) in the public-wireless network 118 when the mobile-subscriber terminal registers in the public-wireless network 112.

The mobile-subscriber terminal 116 may identify itself to public-wireless and/or private-wireless networks 112, 118 using one or more types of identification codes. The identification codes may be unique numbers permanently assigned to the mobile-subscriber terminal 116 or, alternatively, dynamically assigned to the mobile-subscriber terminal 116 on the occurrence of an event, such as registration.

For example, the identification codes for the mobile-subscriber terminal operating in the public-wireless network may be a Mobile Identification Number (MIN), Mobile Directory Number (MDN), mobile station identifier (MSID), Electronic Serial Number (ESN), mobile equipment identifier (MEID), and an Internet Protocol (IP) address or other suitable identifier. In the private-wireless network, the identifier may be, for example, a Medium Access Control (MAC) address, an IP address, or other suitable identifier.

Both of the public-wireless and private-wireless network 112, 118 are coupled to a common transport network 114 via a common gateway 120. The public-wireless network 112 provides a first communication path to the common gateway 120, and the private-wireless network 118 provides a second communication path to the common gateway 120.

When registered and operating in the public-wireless network 112, the mobile-subscriber terminal 116 communicates with public-wireless access node 122 over a first wireless interface. When registered and operating in the private-wireless network 118, the mobile-subscriber terminal 116 communicates with the private access node 124 over a second wireless interface.

The first and second interfaces may be configured in accordance with the same of different standardized, proprietary or ad-hoc protocol. The first interface may conform to a format such as AMPS, TDMA, GSM, CDMA, Wideband CDMA, CDMA2000, UMTS or some other public-wireless format. The second interface may conform to a format such as an IEEE 802.11 wireless-local-area-network protocol (WLAN), the Bluetooth specification, and/or other WLAN format. The AMPS, TDMA, GSM, CDMA, wideband CDMA, CDMA2000, UMTS formats may be used as well if carried out in an unlicensed frequency band.

While not shown, public-wireless and private-wireless networks 112, 118 may also include various interconnected network elements. These interconnected network elements may provide additional segments of the first and second communication paths.

The common gateway 120, a proxy thereof, or other network entity may execute the application 150 to carry out roaming-rule-decision making for the mobile-subscriber terminal 116. To facilitate such decision making, the application 150 may contain programmable instructions, software modules or other processing directives that can be executed and stored in memory (not shown).

The application 150 may in turn be in communication with a roaming-agreement database (RADB) 152. The RADB 152 may contain roaming-agreement information (e.g., data and commands) for the mobile-subscriber terminal 116 when roaming from the public-wireless network 112 to private-wireless network 118, and vice-versa.

The roaming agreement information may contain various parameters, conditions, criterion-based factors and roaming rules for carrying out the delivery of services while roaming. These parameters, conditions, criterion-based factors and roaming rules may be previously agreed to by carriers of the public-wireless and private-wireless networks 112, 118.

Alternatively, the roaming agreement information may be presented to the carriers of the public-wireless or private-wireless network upon the mobile-subscriber terminal 116 roaming into their network. In such case, the roaming agreement information may also be presented to a subscriber or user of the mobile-subscriber terminal 116 for negotiation and acceptance or rejection of the financial responsibility for such services. Thus, when the subscriber or network carrier of either of the public-wireless network or the private-wireless network 112, 118 accepts responsibility for service, then the agreed-to roaming agreement information may be associated with the mobile-subscriber terminal 116 and stored accordingly in the roaming-agreement database.

The roaming agreement database 152, or a replicated instance thereof, may be maintained in the public-wireless network 112, the private-wireless network 118 or another network (not shown). These networks may have internal databases and database management systems (DBMSs) for controlling the organization, storage, retrieval, security and integrity of data in the internal databases. Thus, the DBMS may carry out the process of replication, downloading and/or storing updates of some or all of the roaming-agreement information. Local updates may be transferred back to the roaming agreement database 152 by the DBMS.

The DBMSs may carry out these and other database management processes (i) periodically, (ii) responsive to detecting the mobile-subscriber terminal 116 roaming in its network, and/or (iii) at any other time. However, before being allowed access the roaming agreement database 152, the network provider and/or the user of the mobile-subscriber terminal may have to enter, acknowledge, and/or authenticate their security, privacy and permissions authorizations.

The roaming agreement information may be logically or relationally indexed or otherwise categorized in the roaming-agreement database 152 so that the various parameters, conditions, criterion-based factors and roaming rules may be efficiently accessed. In one exemplary indexing arrangement, the roaming agreement information may be indexed by the identity of the mobile-subscriber terminal 116. Thus, the roaming agreement information may be indexed by the MIN, MDN, MSID, MEID, ESN, MAC address, IP address, network interface address, or other identifier associated with the mobile-subscriber terminal 116.

The indexing of the roaming agreement information, however, may differ depending on where the roaming-agreement database 152 or an instance thereof is maintained. For example, the roaming-agreement database 152 may be indexed by the MIN when operating in the public-wireless network 112, but be indexed by the MAC address when roaming in the private-wireless network 118.

In any case, the application 150, whether residing in the public-wireless network 112, the private-wireless network 118 or other network, has access to the roaming-agreement database 152 or some instance thereof. Using the stored roaming-agreement information along with service profile, the application 150 may determine the roaming rules for roaming from the public-wireless network 112 into the private-wireless network 118, and vice-versa.

Figure 2:
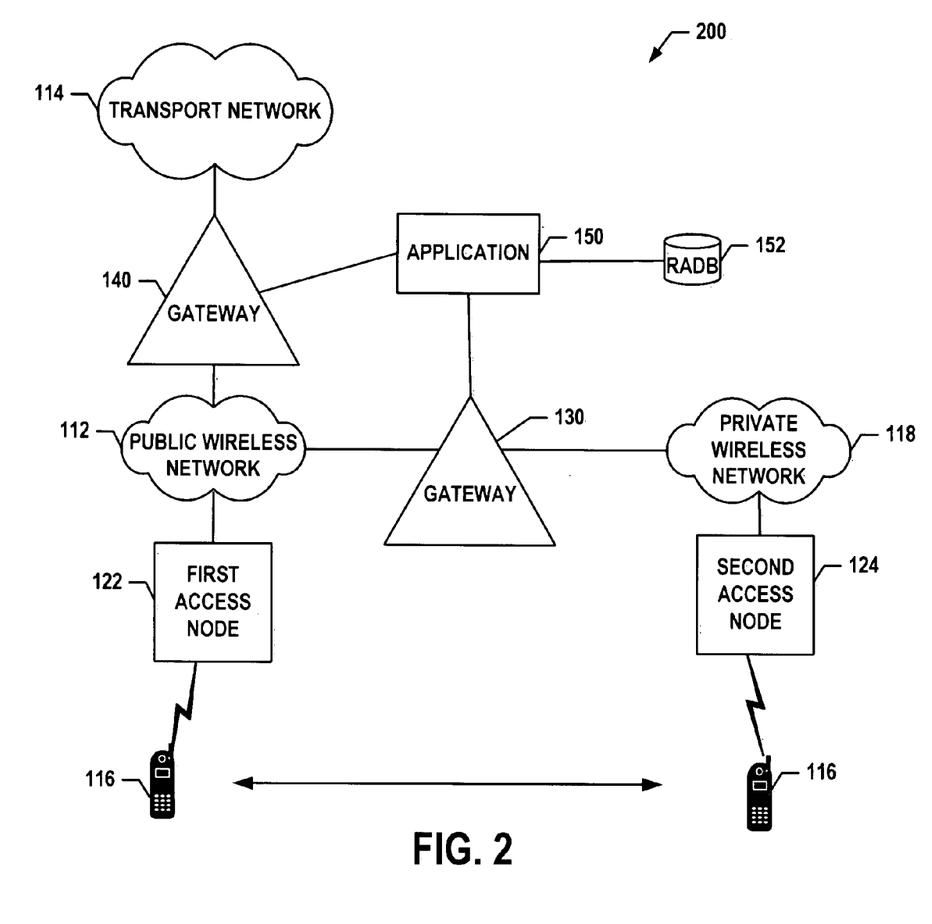
FIG. 2 is a second block diagram depicting a non-common-gateway architecture for carrying out roaming-rule-decision making in accordance with an exemplary embodiment.

FIG. 2 depicts a "non-common-gateway" architecture 200 for carrying out roaming-rule-decision making in accordance with an exemplary embodiment. The non-common-gateway architecture 200 includes a transport network 114, a transport gateway 130, the public-wireless network 112, an interface gateway 140, a private-wireless network 118, public-wireless access node 122, and private-wireless access node 124.

In this alternative embodiment, the common gateway 120 and common transport network are not used. The private-wireless network 118 interfaces with the public-wireless network 112 via the interface gateway 130. The public-wireless network 112 then interfaces to the transport network 114 via the transport gateway 140. Thus, communications originated from or terminated to the mobile-subscriber terminal 116 operating in the private-wireless network, not only pass through the private-wireless network 118, but also the public-wireless network 112.

As one skilled in the art will recognize, the public-wireless and private-wireless networks may be interchanged. Further, different architectures may be used for different types of communications. For instance, the non-common-gateway architecture 200 may be chosen for carrying only voice communication, whereas the common-gateway architecture 100 may instead be selected for non-voice communications. Various other architectural schemes may be used as well.

2. Mobile Station's Modes

As noted, the mobile-subscriber terminal 116 may be a multimode device configured to communicate in one or more differing communication modes. One communication mode may be for operating in the public-wireless network 112 and another may be for operating in the private-wireless network 118. The mobile-subscriber terminal 116 may use, for example, a first protocol ("first-protocol mode") when operating the first access system 112. And when operating in the private-wireless network 118, the mobile-subscriber terminal 116 may operates according to a second protocol ("second-protocol mode").

Details of a multimode mobile-subscriber terminal that can operate in differing access systems are provided by co-pending U.S. application Nos. (i) Ser. No. 10/233,247, filed on Aug. 30, 2002, and titled "Method and System for Intersystem Wireless Communication Session Arbitration," (ii) Ser. No. 09/595,595, filed on Jun. 15, 2000, and titled "Public-wireless Network Integrated with Private-wireless Network," (iii) Ser. No. 10/161,497, filed on Jun. 3, 2002, and titled "Method and System for Diverting Wireless Network Communications," and (iv) Ser. No. 10/161,313, filed on Jun. 3, 2002, and titled "Method and System for Intersystem Wireless Communication Session Hand-Off;" all of which are owned by the same assignee as the present application and fully incorporated herein by reference. Other modes are possible, as well.

3. Exemplary Operation

Figure 3:
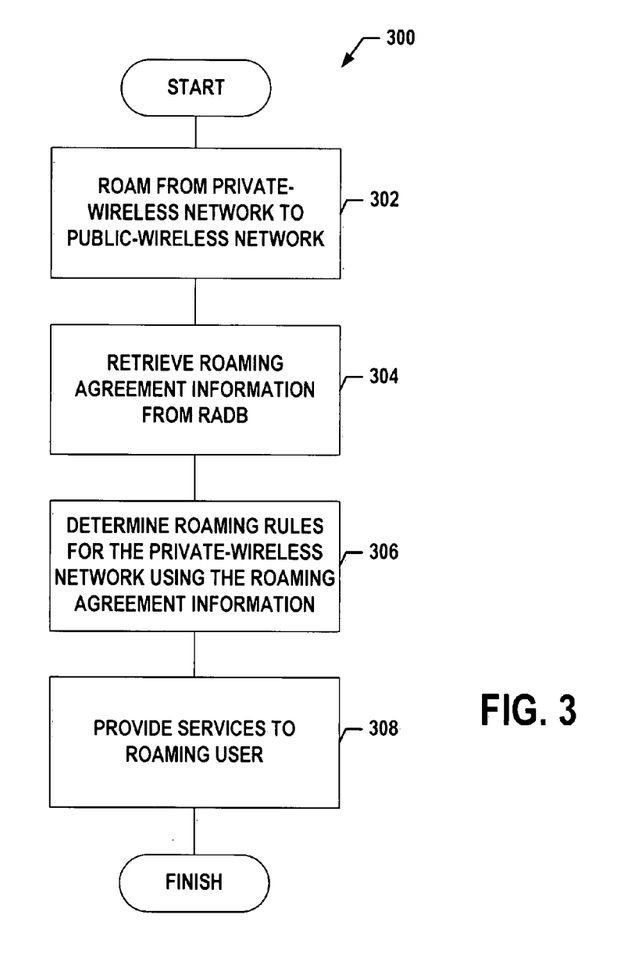
FIG. 3 is a flow chart illustrating roaming-rule-decision making in accordance with an exemplary embodiment.

FIG. 3 is a flow chart 300 illustrating roaming-rule-decision making in accordance with an exemplary embodiment. This roaming-rule-decision making embodiment allows telecommunication services to be provided to the mobile-subscriber terminal 116 roaming in the private-wireless network 118. Except where noted, the flow of the flow chart 300 is described in reference to the common-gateway architecture 100, although the flow may be carried out in most any network. The roaming-rule-decision making may be carried out in the same manner as described below when the mobile-subscriber terminal 116 roams in the public-wireless network 112.

Referring now to FIG. 3, the mobile-subscriber terminal 116 roams into the coverage area of the private-wireless network 118, as shown in block 302. Consequently, the mobile-subscriber terminal 116 may register with the private-wireless network 118. Registering may include providing authorization, authentication, accounting and/or security credentials. While registering, preference information about the mobile-subscriber terminal 116 may be garnered from the service profile.

In response to registering in the private-wireless network, the common gateway 120 or other processor executes the application 150. The application 150 via a link to roaming agreement database 152 retrieves the stored roaming-agreement information as shown in block 304. To facilitate this retrieval, the application 150 may use the MAC or IP address of the mobile-subscriber terminal 116 in a query of the roaming-agreement database 152. Responsive to the query, the roaming-agreement database provides to the application 150 the various parameters, conditions, criterion-based factors and roaming rules. As will be described in more detail below, the roaming agreement information retrieved from the roaming-agreement database 152 may include information for carrying out routing, registration and authentication, call-state, location-based-services, and cost protocols.

Using the roaming-agreement information and the preference information as inputs, the application 150 may determine the roaming rules for operating in the private-wireless network 118, as shown in block 306. The private-wireless network 118 may then provide services to the roaming mobile-subscriber terminal 116 in accordance with the roaming rules as shown in block 308.

4. Roaming Rule Determination

Figure 4:
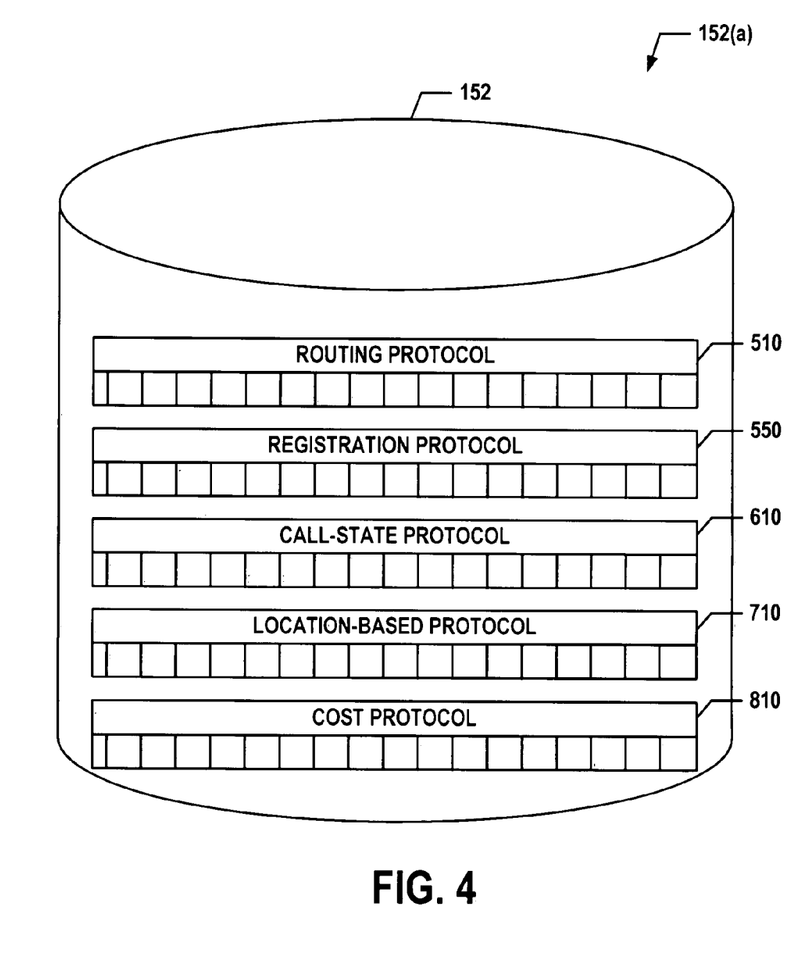
FIG. 4 is a collection of protocols that may be included among the exemplary roaming-agreement information.

FIG. 4 is a collection of protocols 152(a) that may be included among the exemplary roaming-agreement information. As noted, the application 150 may use the collection of protocols 152(a) to determine the roaming rules for operating the mobile-subscriber terminal 116 when roaming between the public-wireless and private-wireless networks 112, 118.

The collection of protocols 152(a) may, for example, be stored in the roaming-agreement database 152 in the form of a routing protocol 510, registration protocol 550, call-state protocol 610, location-based-services protocol 710, and cost protocol 810. These exemplary protocols are not intended to be an exhausting or inflexible list of roaming-agreement information, but rather to illustrate the breadth of roaming rules that may be ascertained.

FIGS. 5–9 are block diagrams 500–800 illustrating each of the exemplary protocols 510–810 in more detail. In each of these block diagrams 500–800, a third network architecture 400 is illustrated. This network architecture 400 contains a public-wireless network and private-wireless network into which the mobile-subscriber terminal 116 may roam.

The communications served by public-wireless network may conform to a format such as AMPS, TDMA, GSM, CDMA, Wideband CDMA, CDMA2000, UMTS or some other public-wireless format. The communication served by the private-wireless network may conform to a format such as an IEEE 802.11 wireless-local-area-network protocol (WLAN), the Bluetooth specification, and/or other WLAN format. The AMPS, TDMA, GSM, CDMA, wideband CDMA, CDMA2000, UMTS formats may be used as well if carried out in an unlicensed frequency band.

Typically, the public-wireless network and the private-wireless network may use different formats. For instance, the public-wireless network may conform to CDMA protocols (hereinafter referred to as the "CDMA network 412"), and the private-wireless network may conform to the IEEE 802.11 WLAN protocols (hereinafter referred to as the "802.11 network 418"). Details of preferred CDMA protocols are set forth in the ANSI/TIA/EIA-95-B-99 standard published by the Telecommunications Industries Association/Electronic Industries Association (TIA/EIA), which is fully incorporated herein by reference. The particulars of the IEEE 802.11 standard published by the Institute of Electrical and Electronics Engineers, Inc., which is fully incorporated herein by reference.

The third architecture 400 may also include a transport network 414 along with the common gateway 120, a public gateway or BSC 426, and a private or "media" gateway 436. The common gateway 120 may communicatively couple the CDMA network 412, the 802.11 network 418, and the transport network 414. The BSC 426 may communicatively couple the CDMA network 412 with the transport network 414. Similarly, the media gateway 436 may communicatively couple the 802.11 network 418 with the transport network 414.

A. Public-wireless Network

When operating within its coverage area, the CDMA network 412 provides telecommunication services or more simply "serves" the mobile-subscriber terminal 116. As noted above, the CDMA network 412 may be communicatively coupled to the transport network 414 via several routes. This allows communications exchanged between the transport network 414 and the mobile-subscriber terminal 116 to be routed through the various routes. For instance, a subscriber to the CDMA network 412 may have communications routed through a BTS 422 coupled to the BSC 426 and in turn the transport network 414.

The BTS 422 generally includes one or more antennas that define a wireless coverage area, or "cell," for the CDMA network 412. Although FIG. 4 illustrates only one BTS, namely BTS 422, the public-wireless network 412 may include more than one BTS. In one arrangement, the cell may be partitioned into "sectors" using directional antennas. Within the coverage area of the cell, the BTS 422 and other BTSs (not shown) may communicate with the mobile-subscriber terminal 116 over a wireless interface.

In communications exchanged between the mobile-subscriber terminal 116 and the BTS 422, the format of the communications conform to a particular protocol, which typically is defined by the format of the public-wireless network. In this case, the mobile-subscriber terminal 116 and the BTS 422 may transmit communications over the wireless interface using the Enhanced Variable Rate Coder (EVRC) standard. Details of the preferred Enhanced Variable Rate Coder standard are set forth in the TIA/EIA/IS-127 standard, published by the Telecommunications Industries Association/Electronic Industries Association (TIA/EIA), which standard is fully incorporated herein by reference.

The BSC 426 typically manages the BTSs under its control; managing such parameters as the BTSs' power levels and frequencies transmitted. The BSC 426 may also control communication session hand-offs for the mobile-subscriber terminal 116 moving between the several BTSs. Accordingly, the BSC 426 may contain intelligent switching functionality, generally found within the domain of other network elements, such as an MSC (not shown). After receiving instructions or "signaling" to direct a given communication session to the transport network 414 from the MSC, the gateway 120 or some other switch, the BSC 426 may then provide a communication path between the mobile-subscriber terminal 116 and the transport network 414.

Although other signaling systems may be used, the signaling between the BSC 426 and the MSC, the gateway 120, or some other switch may be carried out using IS-41 or GSM Mobile Application Part MAP (GSM MAP). Details of the IS-41 signaling system may be found in the ANSI/TIA/EIA-41-D-97 standard, which was published in 1997, and which is fully incorporated herein by reference. Furthermore, details of GSM MAP signaling system may be found in the European Telecommunications Standards Institute ETS 300 599 ed. 9 standard (GSM 09.02 version 4.19.1), which was published in 2001, and which is fully incorporated herein by reference.

The content of a communication transmitted by the BSC 426 to the transport network 414 may contain data along with or separate from vocoded voice or bearer content in accordance with a protocol such as International Telecommunications Union (ITU) G.711. Other protocols may be used as well.

Although shown as an element separate from the BTS 422, as an alternative, the BSC 426 may be co-located with one of the BTSs. As another alternative, the BSC 426 may be co-located with a MSC or the functions carried out by the MSC may be integrated into BSC 426. In yet another alternative, the BSC 426 might not be used at all, and in which case, one or more of the various interconnected elements of the public-wireless network 412 may carry out its functions.

B. Private-wireless Network

Analogous to the CDMA network 412, the 802.11 network 418 serves telecommunication services to the mobile-subscriber terminal 116 when registered in the 802.11 network 418. Communications exchanged between the transport network 414 and the mobile-subscriber terminal 116 via the 802.11 network 418 may also be routed through various routes. A subscriber of the 802.11 network 418 may, for example, have communications routed through a wireless access point 424 and a WLAN server 432.

The wireless access point 424 may provide base station functionality for the WLAN. Base station functionality furnishes the mobile-subscriber terminal 116 with access to the 802.11 network 418 via a wireless interface along with acting as a bridge and/or "portal" between the mobile-subscriber terminal 116 and the WLAN server 432. The wireless access point 424 performs portal functions by providing address and protocol translation for communications exchanged between the wireless access point 424 and the WLAN server 432.

Exemplary architecture to carry out these functions may be provided by a wireless access point 424 that consists of a radio transceiver, a wired-network interface, and a bridging-software application, which may conform to the IEEE 802.11d bridging standard. Alternatively, the portal's functionality may be integrated into the WLAN server 432, so that communications exchanged between the wireless access point 424 and the WLAN server 432 are transmitted without being translated. As another option, the portal may comprise a standalone WLAN network element, for example, a bridge or gateway interconnecting the wireless access point 424 and WLAN server 432.

Exemplary architecture for the WLAN server 432 may include a processor, e.g., personal computer or workstation, or a peripheral device, such as a data storage device, that runs operating and application software for managing the resources for the 802.11 network 418. The WLAN server 432 may employ architecture and application software that allows the WLAN server 432 to communicate with the media gateway 436 according to the Internet Protocol ("IP") or some other packet data protocol.

Although only one access point 424 and one WLAN server 432 are illustrated, the 802.11 network 418 may contain a plurality wireless access points and WLAN servers. Alternatively, the 802.11 network 418 might not include a WLAN server 432 as a separate element. In such case, the functions of the WLAN server 432 may be integrated into the wireless access point 424. In yet another arrangement, the 802.11 network 418 might not include either a wireless access point or WLAN server as separate network elements. As such, the wireless access point's functionality and WLAN server's functionality may be integral to or integrated into one or more of the other various interconnected private-wireless network elements (not shown).

The coverage area of the 802.11 network 418 and the coverage area of the CDMA network 412 may overlap; however, such overlap is not required. In an overlap situation, when registered in the 802.11 network 418, the mobile-subscriber terminal 116 may be simultaneously registered in the CDMA network 418. Further details regarding the communication control for simultaneous registration of a mobile-subscriber terminal in both a public-wireless network and private-wireless network are provided by pending U.S. application Ser. No. 09/595,595, filed on Jun. 15, 2000, and entitled "Private-wireless Network Integrated with Public-wireless Network," which is fully incorporated herein by reference.

C. Gateway

Gateway 120 may provide protocol conversion functionality for communications exchanged between the mobile-subscriber terminal 116 and either the CDMA network 412 or the 802.11 network 418. Gateway 420 may also provide an encoding function to encode and decode communication data. Additionally, gateway 420 may include switching functionality for routing communications between and among the mobile-subscriber terminal 116, CDMA network 412, 802.11 network 418, and the transport network 414.

Exemplary architecture of gateway 120 includes a (i) signaling controller for signaling elements of the CDMA and 802.11 network networks 412, 418, (ii) a media gateway for sending and receiving communications over a packet-switched data network, and (iii) a media gateway controller for intermediating communications between the media gateway and the signaling controller, and for translating communications between a packet data network and a PSTN. Details regarding a preferred, exemplary architecture of the gateway 120 are provided by another U.S. patent application Ser. No. 10/161,497, filed Jun. 3, 2002, entitled "Method and System for Diverting Wireless Network Communications."

D. Routing and Registration Protocols

Figure 5:
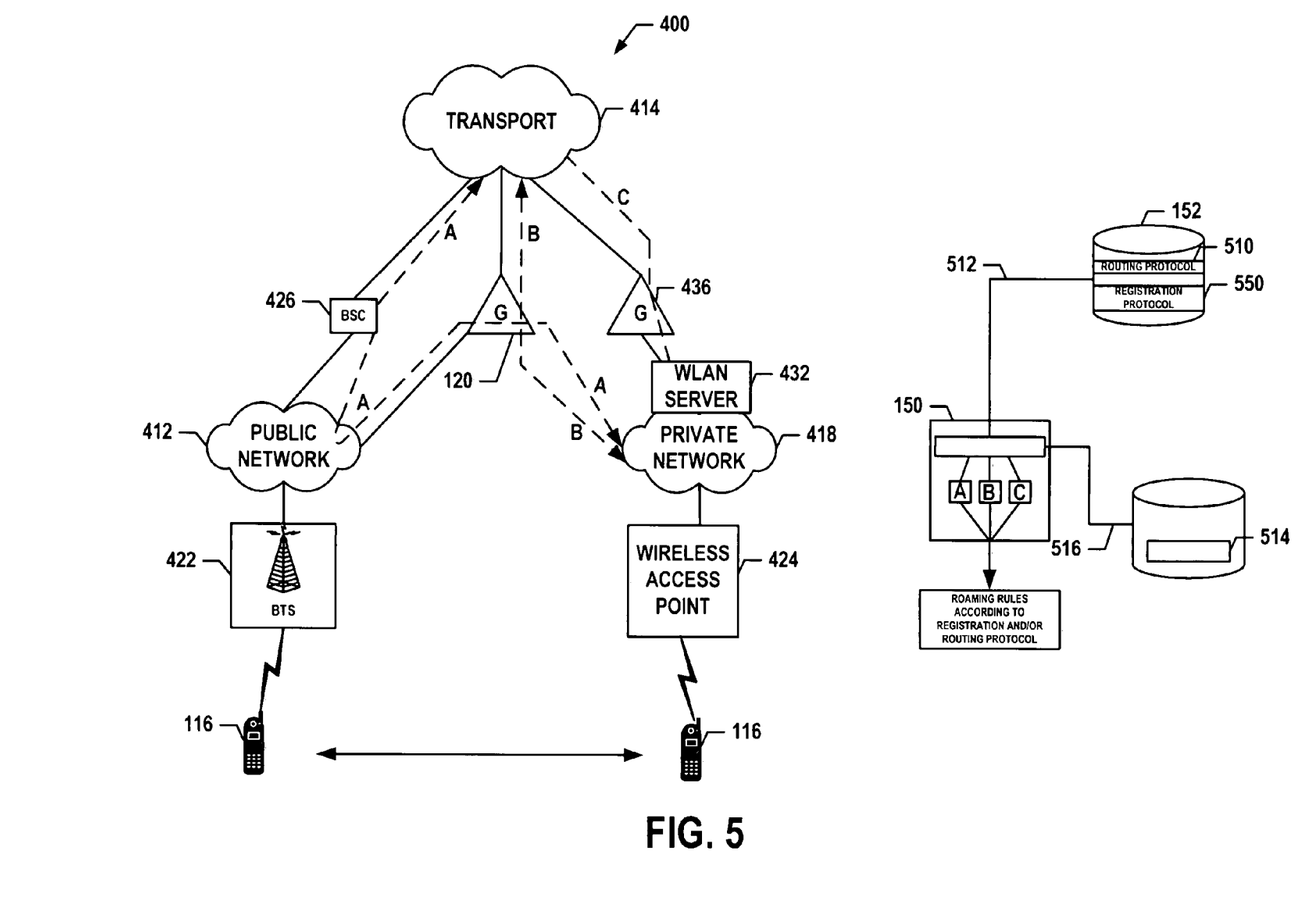
FIG. 5 is a third block diagram illustrating exemplary embodiment of an application determining the roaming rules using the routing protocol and/or the registration protocol.

Referring now to FIG. 5, a block diagram 500 illustrates the application 150 determining the roaming rules using the routing and/or the registration protocols 510, 550. The routing protocol 510 may contain various parameters, conditions, criterion-based factors and rules for determining how communications are to be routed through the network architecture 400. The registration protocol 550 may contain various parameters, conditions, criterion-based factors and rules for determining the registration requirements for obtaining service in the network architecture 400

The application 150 may determine how to route communications to and from the mobile-subscriber terminal 116 when it roams into the 802.11 network 418. When moving to this location, the mobile-subscriber terminal 116 may establish link-layer or other lower-layer protocol connectivity with the 802.11 network 418. In establishing link-layer connectivity, the mobile-subscriber terminal 116 detects the presence of the 802.11 network 418 and begins to register.

During registration, the WLAN server 432 or some other device may cause the application 150 to query the roaming-agreement database 152 to determine the registration requirements before serving mobile-subscriber terminal 116, as shown by application-to-database interconnect 512. Different levels of registration may be implemented. For instance, registering with the 802.11 network 418, in the simplest form, may include merely "associating" the mobile-subscriber terminal 116 with the 802.11 network 418 via the wireless access point 424. Registering, however, may also include "logging" into the 802.11 network 418, which may include providing a username and password.

Further, registering with the 802.11 network 418 may include employing secure connection services such as IEEE 802.11 Wired Equivalency Privacy (WEP), security system identification (SSID), extensible authentication protocol (EAP) or other secure connection service. Registration may also employ accounting services, which may be used in conjunction with the call-state protocol 610 discussed below. These accounting services allow the 802.11 network 418 to determine the financial status of the subscriber's account, such as whether the subscriber's account is paid-up or delinquent. The accounting services may also be used to alert the subscriber of the 802.11 network 418 of the remaining units left in the subscriber's account. The units may be in terms of minutes, bytes, unit of currency, or other metric.

The process of associating the mobile-subscriber terminal 116 with the 802.11 network 418 may include one or more steps that occur during an ongoing communication. Although described in more detail in the IEEE 802.11 protocol, an example of associating the mobile-subscriber terminal 116 and 802.11 network 418 is illustrated with the following three steps.

First, the mobile-subscriber terminal 116 senses the wireless medium, and if the medium is free (i.e. no other mobile-subscriber terminal currently transmitting to the wireless access point 424), then the mobile-subscriber terminal 116 transmits a request for synchronization information from the wireless access point 424. If, however, the wireless medium is busy, the mobile-subscriber terminal 116 delays transmission for a period of time before re-requesting the synchronization information. Once the synchronization information is received, the mobile-subscriber terminal 116 adjusts as needed, and then synchronizes with the wireless access point 424.

Second, after receiving the synchronization information and synchronizes with wireless access point 424, the mobile-subscriber terminal 116 then "authenticates" with the 802.11-format WLAN 418. To authenticate, the mobile-subscriber terminal 116 and the wireless access point 424 exchanges frames or packet-data, containing their respective identities or addresses. The exchange of frames may eventually result in the mutual verification of identity.

To continue with the process of association, the mobile-subscriber terminal 116 and the wireless access point 424 mutually authenticate. If either the mobile-subscriber terminal 116 or the wireless access point 424 do not mutually authenticate, then the wireless access point 424 de-authenticates or otherwise denies access to the mobile-subscriber terminal 116.

Third, once authenticated, the mobile-subscriber terminal 116 sends an association request to the wireless access point 424. This may include sending an IEEE 802.11 or some other format packet-data address (802.11 address) of the mobile-subscriber terminal 116. The association request may also include the 802.11 address of the wireless access point 424. In response to the association request, the wireless access point 424 sends to the mobile-subscriber terminal 116 an association response, which contains either, a "successful" or "unsuccessful" association result.

Upon "successful" association, the response includes an association identifier that notifies the mobile-subscriber terminal 116 that the 802.11 network 418 has data ready to send to it. Once associated, the mobile-subscriber terminal 116 is capable of transmitting and receiving communications with the 802.11 network 418.

In addition to the three steps noted above, when roaming or otherwise outside the coverage area of wireless access point 424, but within the coverage area of the 802.11 network 418, the process of association may include the mobile-subscriber terminal 116 "re-associating" with the other wireless access points, with or without disassociating with wireless access point 424. Once re-associated, the WLAN subscriber's mobile-subscriber terminal 116 is capable of communicating with the other wireless access points of the 802.11 network 418, and if still associated, with wireless access point 424 as well.

After registering, the WLAN server 432 or other element in the 802.11 network 418 may send to the CDMA network 412 a notification message notifying it that the mobile-subscriber terminal 116 has roamed into the in the 802.11 network 418, which may or may not be out of the coverage area of the CDMA network 412. This notification message may be a registration notification message that may contain the identity of the mobile-subscriber terminal 116 and the 802.11 network 418. The CDMA network 412 may store this information in its instance of the roaming agreement database and/or its central repository. This information may be used to assist in locating, paging, forwarding, and terminating services to the mobile-subscriber terminal 116 operating in the in the 802.11 network 418.

Some time after registering, if needed, the application 150 may query the roaming-agreement database 152 to retrieve the routing protocol 510, as again shown by application-to-database interconnect 512. Before making this query, however, the application 150 may first query a subscriber profile 514 for subscriber preferences and identification information, as shown by application-to-profile interconnect 516. This identification information may be used to locate the routing protocol 510 in the roaming-agreement database.

After receiving the routing protocol 510, the application 150 may determine that since the mobile-subscriber terminal 116 has roamed from the CDMA network 412 then communications can be routed through exemplary paths "(A)," "(B)," and/or "(C)" as shown. Certain types of communications, for example, voice communications may be routed back through the CDMA network 412, thereby keeping the CDMA network 412 in the communication path. Thus, communications between the mobile-subscriber terminal 116 and the transport network 414 may be routed via path (A). That is, the communication may pass through the wireless access point 424, the WLAN server 432, the common gateway 120, and the BSC 426.

Other types of communications, such as data communications, may be more routed to the transport network 414 without going through the CDMA network 412, thereby freeing up resources of the CDMA network 412. In such case, communications between the mobile-subscriber terminal 116 and the transport network 414 may be routed via path (C). As shown, path (C) may include the wireless access point 424, the WLAN server 432, and the media gateway 436.

Assuming that the common gateway 120 provides increased throughput, better translation services, better quality of service or other benefits not provided by the media gateway 436, path (B) may be selected over path (C). Communications may be routed through the common gateway 120 for other reasons as well.

Alternatively, the routing protocol 510 may specify that all communications be routed back through or, alternatively, independently of the CDMA network 418. And if the transport network 414 is embodied as a packet data network, such as the Internet, voice communications that are routed independently of the public-wireless network may be formatted according to a voice-over-packet-data protocol, such as Voice-over-Internet Protocol (VoIP).

The foregoing described examples of the application 150 determining the roaming rules according to the routing and registration protocols 510, 550 for the mobile-subscriber terminal 116 (a subscriber of the public-wireless network 412) roaming the coverage area of the 802.11-format WLAN 418. As one skilled in the art will recognize, the application 150 may likewise determine the roaming rules using the routing and registration protocols 510, 550 when a subscriber of the 802.11-format WLAN 418 roams in the coverage area of the public-wireless network 412.

E. Call-State Protocol

Figure 6:
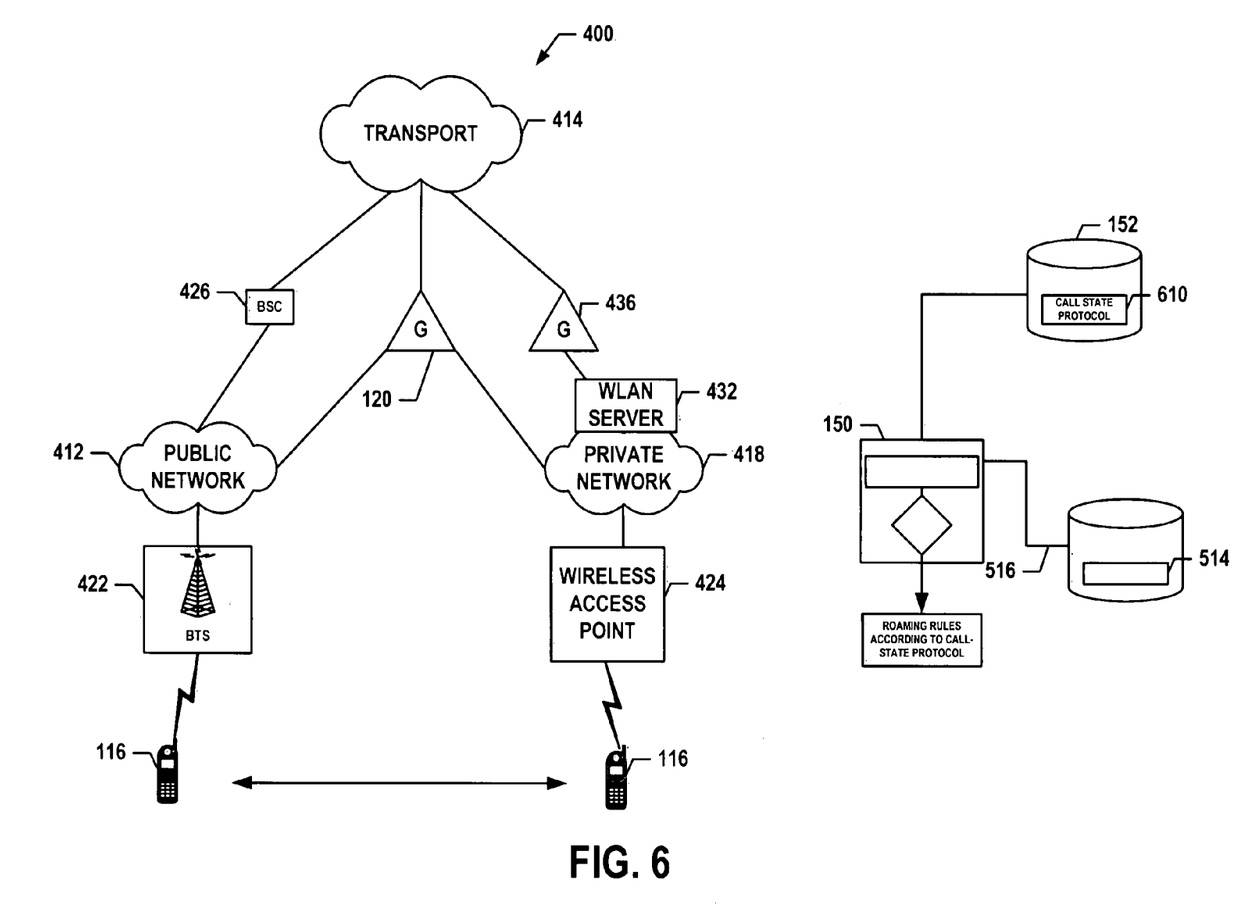
FIG. 6 is a fourth block diagram illustrating an exemplary embodiment of the application determining the roaming rules using the call-state protocol.

Referring now to FIG. 6, a block diagram 600 illustrates an exemplary embodiment of the application 150 determining the roaming rules using the call-state protocol 610. The call-state protocol 610 may contain various parameters, conditions, criterion-based factors and rules for determining billing and other accounting services for communications routed through the network architecture 400.

While feasible, implementing centralized and/or "coordination-of-services" billing for both of the CDMA and 802.11 networks 412, 418 might not be straightforward given that a subscriber is essentially obtaining subscriptions from providers of both of the CDMA and 802.11 networks 412, 418. And given the potentially disparate technologies between the CDMA network 412 and the 802.11 network 418, however, call-state information (e.g., off-hook, dialing, call duration, call termination, on-hook, etc) may be maintained in the network into which the mobile-subscriber terminal 116 has roamed. To determine whether to maintain and what type of call-state information to maintain, the various parameters, conditions, criterion-based factors and rules of the call-state protocol 610 may be used.

When, for example, the mobile-subscriber terminal 116 roams into and registers in the 802.11 network 418, the application 150 may query the roaming agreement database 152 for the stored call-state protocol 610. The subscriber preferences and identification information may be used in the query to locate the call-state protocol 610 in the roaming-agreement database 152.

After retrieving the call-state protocol 610, the application 150 may determine that the call-state information is to be maintained or stored in the 802.11 network 418 even though the home network of the mobile-subscriber terminal is the CDMA network 412. The call-state information can then be forwarded to the CDMA network 412 at the termination of a communication, periodically or at some other time.

The call-state protocol 610 may instead provide parameters, conditions, criterion-based factors and rules with which the application 150 may determine that call-state information is to be routed to the CDMA network 412 during an ongoing communication. As such, the call-state information is not maintained in the 802.11 network 418 (i.e., locally) for more than a short period of time. The call-state information may be sent in real time, near-real time or at other similar period of time. Other maintenance schemes are possible as well.

The foregoing described an example of the application 150 determining the roaming rules according to the call-state protocol 610 when the subscriber of the roams from CDMA network 412 into the coverage area of the 802.11 network 418. As one skilled in the art will recognize, the application 150 may likewise determine the roaming rules when a subscriber of the 802.11 network 418 roams in the coverage area of the CDMA network 412.

F. Location Based Protocol

Figure 7:
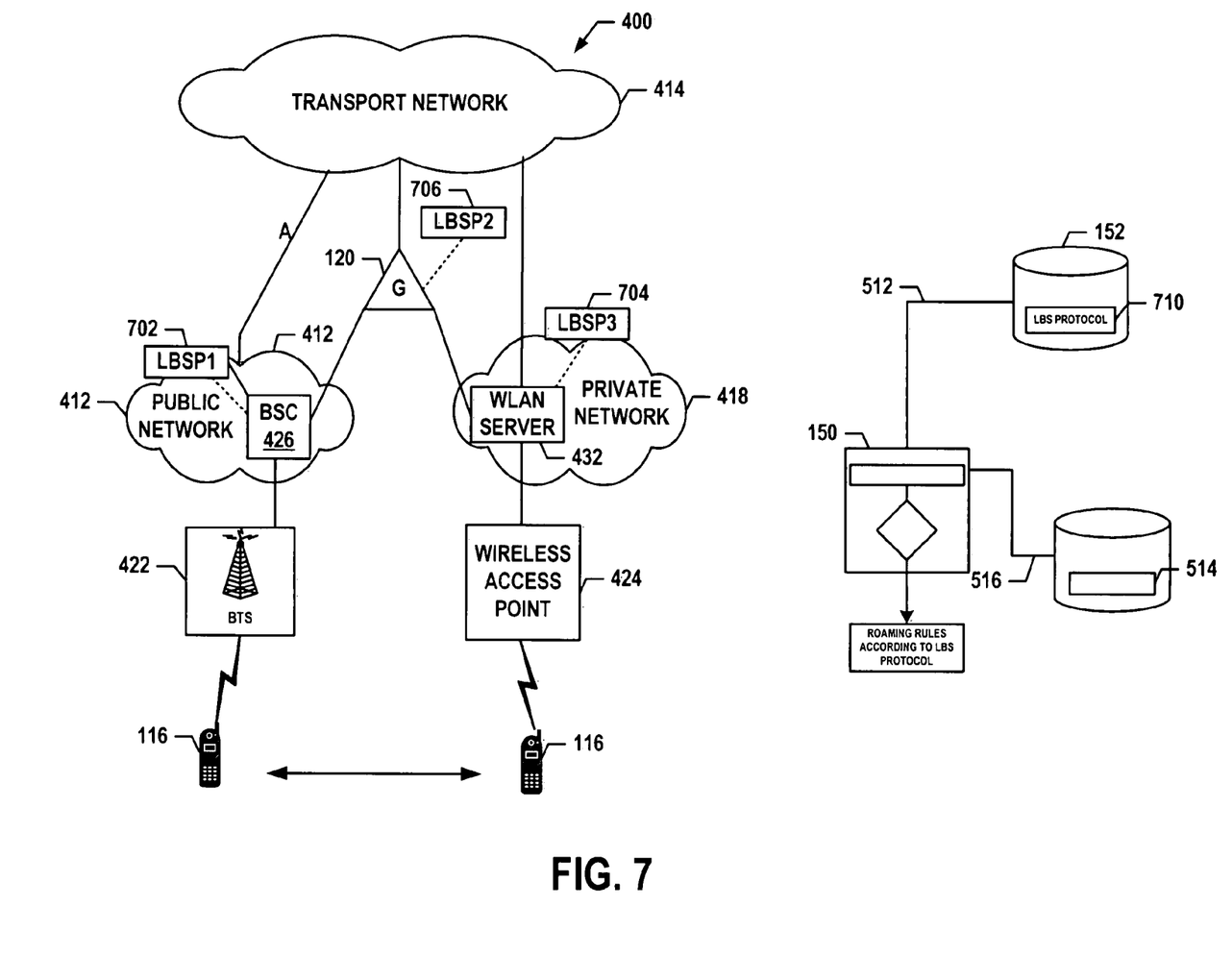
FIG. 7 is a fifth block diagram illustrating an exemplary embodiment of the application determining the roaming rules using the location-based-services protocol.

FIG. 7 is a block diagram 700 illustrating an exemplary embodiment of the application 150 determining the roaming rules using the location-based-services protocol 710. The conceptual block diagram 700 is similar to the block diagram 600 shown in FIG. 6, except that the block diagram 700 includes first, second and third location-based-service providers ("LBSP") 702–706.

The first LBSP 702 may be co-located and under the control of the provider of the CDMA network 412. Similarly, the second LBSP 704 may co-located and under the control of the provider of the 802.11 network 418. The first and second LBSPs 702, 704 may supply location-based services to subscribers of the respective networks. If, however, the coverage areas of the CDMA network 412 and the 802.11 network 418 are not mutually exclusive or overlap, then the first and second LBSPs 702, 704 may provide location-based services to subscribers of the each other's network.

The third LBSP 706, however, may provide location-based services to both networks, yet be externally located and independent from both the CDMA network 412 and the 802.11 network 418. For instance, the provider of the 802.11 network 418 may partner with a third party to provide location-based services instead of supplying the services themselves. Therefore, the location-based-service protocol 710 may provide parameters, conditions, criterion-based factors and rules with which the application 150 may determine which of the first, second and/or third LBSPs 702–706 to use.

When, for example, the mobile-subscriber terminal 116 roams into and registers in the 802.11 network 418, the application 150 may query the roaming agreement database 152 for the stored location-based-service protocol 710. After retrieving the location-based protocol 710, the application 150 may determine which LBSP to use for location-based services while roaming in the 802.11 network 418. If the location-based protocol 710 specifies that the mobile-subscriber terminal 116 is to receive location-based services from the provider of the 802.11 network 418, then the subscriber may receive location-based services from the second and/or third LBSP 704, 706.

The foregoing described an example of the application 150 determining the roaming rules according to the location-based-service protocol 710 for the mobile-subscriber terminal 116 roaming the coverage area of the CDMA network 412. As one skilled in the art will recognize, the application 150 may likewise determine the roaming rules when a subscriber of the 802.11 network 412 roams in the coverage area of CDMA network 418.

G. Cost protocol

Figure 8:
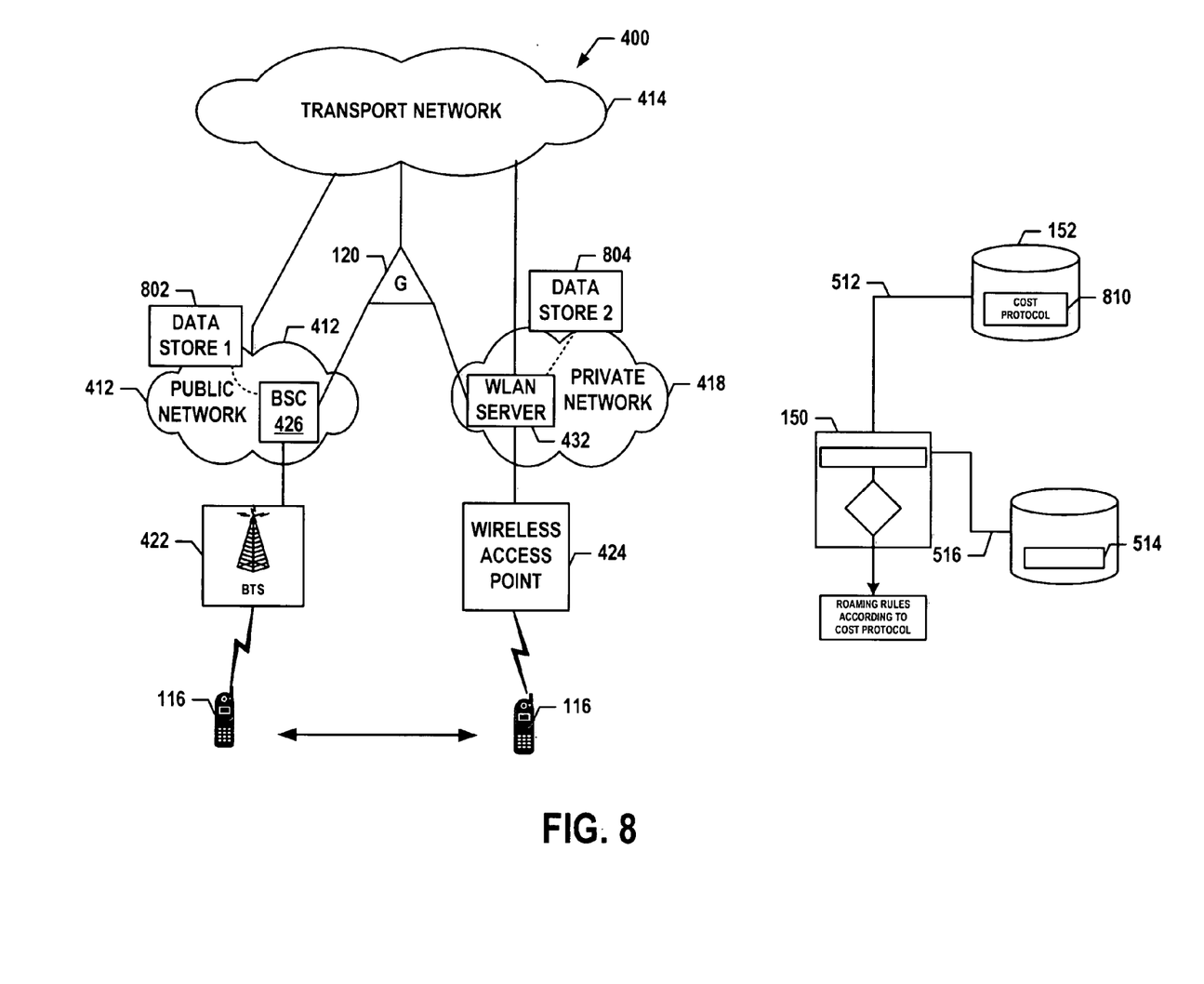
FIG. 8 is a sixth block diagram illustrating an exemplary embodiment of the application determining the roaming rules using the cost protocol.

FIG. 8 is a block diagram 800 illustrating an exemplary embodiment of the application 150 determining the roaming rules using the cost protocol 810. The block diagram 800 is similar to the block diagram 600 shown in FIG. 6, except that the block diagram 700 includes first and second data stores 802, 804. Each of the first and second data stores 802, 804 may be used for storing an instance of subscriber preferences and identification information for roaming and potentially roaming subscribers of each others network.

The information maintained in the first and second data stores 802, 804 may be purchased or licensed, and the downloaded from the providers of the 802.11 network 418 and the CDMA network 412, respectively. The amount of information downloaded, the duration that the information is kept, and any other provisioning of the information may be negotiated. The carriers of the CDMA and 802.11 networks 412, 418 may negotiate these details when partnering to supply a coordination of services. Alternatively, the cost of downloading the information may be presented for negotiation and acceptance when the mobile-subscriber terminal 116 roams into one of the networks.

The cost protocol 810 may also include parameters, conditions, criterion-based factors and rules relating to cost structuring for particular services. Using this cost protocol 810, the application 150 may determine whether to offer the services per the cost structure.

For example, when the mobile-subscriber terminal 116 roams into and registers in the 802.11 network 418, the application 150 may query the roaming agreement database 152 for the stored cost protocol 810. As part of the query, the application 150 may determine the services to which the mobile-subscriber terminal 116 subscribes and the cost structure for these services in the 802.11 network 418. If previously agreed to, then the provider of the 802.11-format WLAN 418 may provide the services to the mobile-subscriber terminal 116 in accordance with the cost structure.

Alternatively, if the cost structure has not been previously negotiated, then the provider of the 802.11-format WLAN 418 may or may not decide to provide the services to the mobile-subscriber terminal 116. If agreement is reached as to the cost structure, then the provider of the 802.11 network 418 may provide the services to the mobile-subscriber terminal 116.

The foregoing described an example of the application 150 determining the roaming rules according to the cost protocol 810 for the mobile-subscriber terminal 116 roaming the coverage area of the 802.11 network 418. As one skilled in the art will recognize, the application 150 may likewise determine the roaming rules when a subscriber of the 802.11 network 418 roams in the coverage area of the CDMA network 412.

5. Conclusion

In the foregoing detailed description, numerous specific details are set forth in order to provide a thorough understanding of exemplary embodiments described herein. However, it will be understood that these embodiments may be practiced without the specific details. In other instances, well-known methods, procedures, components and circuits have not been described in detail, so as not to obscure the forgoing description. Further, the embodiments disclosed are for exemplary purposes only and other embodiments may be employed in lieu of or in combination with of the embodiments disclosed.

In the embodiments described above, the devices and systems may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigured or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

In view of the wide variety of embodiments to which the principles of the present invention can be applied, it should be understood that the illustrated embodiments are exemplary only, and should not be taken as limiting the scope of the present invention. For example, the method steps described may be taken in sequences other than those described, and more or fewer elements may be used in the block diagrams. Further, the claims should not be read as limited to the described order or elements unless stated to that effect. In addition, use of the term "means" in any claim is intended to invoke 35 U.S.C. §112, ¶ 6, and any claim without the word "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

What is claimed is:

1. A method of providing telecommunication services to a mobile-subscriber terminal roaming in a wireless telecommunication network, the method comprising:
   the mobile subscriber terminal roaming into a private-wireless network from a public-wireless network to which it subscribes, wherein the private-wireless network is a wireless local area network, and wherein the private-wireless network and the public-wireless network use different communications formats for communications with the mobile subscriber terminal;
   registering the mobile subscriber terminal on the wireless local area network;
   retrieving roaming-agreement information from a roaming-agreement database, wherein the roaming-agreement information includes a routing protocol;
   determining, based on the routing protocol, whether to route communications with the mobile subscriber terminal over the public-wireless network or over a transport network;
   determining roaming rules, from the roaming agreement information, for operating the mobile subscriber terminal in the private-wireless network; and
   the private wireless network providing to the mobile-subscriber terminal services in accordance with the roaming rules.

2. The method of claim 1, wherein the roaming-agreement database is managed by a private-wireless network device, and further comprising the private-wireless network device periodically updating roaming-agreement information in the roaming-agreement database.

3. The method of claim 1, wherein the roaming-agreement database is managed by a public-wireless network device of the public-wireless network, and further comprising the private-wireless network device populating a local database in the private-wireless network with the roaming-agreement information.

4. The method of claim 3, wherein the public-wireless network device periodically populates the local database with the roaming-agreement information.

5. The method of claim 3, wherein the public-wireless network device populates the local database with the roaming-agreement information in response to the mobile-subscriber terminal roaming into the private-wireless network.

6. The method of claim 5, wherein the step of the mobile-subscriber terminal roaming into the private-wireless network comprises the mobile-subscriber terminal registering in the private-wireless network.

7. The method of claim 1, wherein the mobile-subscriber terminal is identified by a first identifier when operating in the public-wireless network, and wherein the application uses the first identifier when querying the roaming-agreement database for the roaming-agreement information associated with the mobile subscriber terminal.

8. The method of claim 1, wherein the mobile-subscriber terminal is identified by a first identifier when operating in the private-wireless network, and wherein the application uses the first identifier when querying the roaming-agreement database for roaming-agreement information associated with the mobile subscriber terminal.

9. The method of claim 8, wherein the mobile-subscriber terminal is further identified by a second identifier when operating in the public-wireless network, and wherein the application uses the first or second identifier when querying the roaming-agreement database for roaming-agreement information associated with the mobile subscriber terminal.

10. The method of claim 1, further comprising the application using the routing protocol to select one of a plurality of communication paths to use for serving communications to the mobile-subscriber terminal.

11. The method of claim 10, wherein the routing protocol comprises routing logic for serving communications to the mobile-subscriber terminal in the private-wireless network whenever the mobile-subscriber terminal is in the private-coverage area.

12. The method of claim 11, wherein the routing protocol further comprises routing logic for routing communications through the public-wireless network whenever the mobile-subscriber terminal is in the private-coverage area.

13. The method of claim 12, wherein the public-wireless network comprises a home network of the mobile-subscriber terminal.

14. The method of claim 12, wherein the public-wireless network comprises a network in which the mobile-subscriber terminal was last served.

15. The method of claim 11, wherein the private-wireless network interfaces to a transport network, and wherein the routing protocol further comprises routing logic for routing communications through the transport network whenever the mobile-subscriber terminal is in the private-coverage area.

16. The method of claim 15, wherein the transport network comprises the Internet.

17. The method of claim 15, wherein the transport network comprises the Internet, wherein the communications comprise data communications, and wherein the routing logic is operable to route the data communications through the Internet.

18. The method of claim 15, wherein the transport network comprises the Internet, wherein the communications comprise voice communications, and wherein routing logic is operable to route the voice communications through the Internet using a voice-over-packet protocol.

19. The method of claim 11, wherein the routing protocol further comprises routing logic for routing communications through the transport network and not the public-wireless network whenever the mobile-subscriber terminal is in the private-coverage area.

20. The method of claim 11, wherein the public-wireless network serves communications in a first-coverage area, wherein the first-coverage area and private-coverage area are not mutually exclusive, and wherein the routing protocol comprises routing logic for serving communications to the mobile-subscriber terminal in the private-wireless network whenever the mobile-subscriber terminal is in the private-coverage area.

21. The method of claim 10, wherein the routing protocol further comprises routing logic for routing communications through the public-wireless network whenever the mobile-subscriber terminal is in the private-coverage area.

22. The method of claim 1, wherein the roaming-agreement information comprises a registration protocol, and further comprising the mobile-subscriber terminal registering in the private-wireless network according to the registration protocol, wherein the mobile-subscriber terminal registers before being served communications.

23. The method of claim 22, wherein the registration protocol comprises a protocol selected from the group consisting of an authorization protocol, an authentication protocol, an accounting protocol, and a combination of any of the authorization, authentication accounting protocols.

24. The method of claim 22, wherein the registration protocol comprises a notification protocol, and further comprising notifying the public-wireless network when the mobile-subscriber terminal registers in the private-wireless network.

25. The method of claim 24, further comprising the public-wireless network relaying communications for the mobile-subscriber terminal to the private-wireless network.

26. The method of claim 24, further comprising:
the private-wireless network sending to the public-wireless network a registration-notification message containing a network identifier, and
the public-wireless network using the network identifier to locate the mobile-subscriber terminal for relayed communications.

27. The method of claim 1, wherein the roaming-agreement information comprises a call-state protocol, and further comprising the private-wireless-network device collecting call-state information for the mobile-subscriber terminal according to the call-state protocol while the mobile-subscriber terminal operates in the private-wireless network.

28. The method of claim 27, further comprising the private-wireless-network device sending to the public-wireless network the call-state information, wherein the public-wireless network is operable to use the call-state information for billing purposes.

29. The method of claim 27, wherein the call-state information comprises at least call duration information.

30. The method of claim 1, wherein roaming-agreement information comprises a location-based-service protocol, and further comprising the application using the location-based-service protocol to determine a location-based service provider for the mobile-subscriber terminal when the mobile subscriber terminal is operating in the private-wireless network.

31. The method of claim 30, wherein the location-based-service protocol specifies that the private-wireless network is the location-based service provider.

32. The method of claim 30, wherein the location-based-service protocol specifies that the public-wireless network is the location-based service provider.

33. The method of claim 30, wherein the location-based-service protocol specifies that a third-party-location-based-service provider is the location-based-service provider.

34. The method of claim 1, wherein roaming-agreement information comprises a cost protocol, and further comprising the application using the cost protocol to determine whether to provide service to the roaming mobile-subscriber terminal.

35. The method of claim 34, wherein the cost protocol comprises an agreed-upon cost for a given service.

36. The method of claim 34, wherein the cost protocol comprises a negotiable rate for a given service.

37. A method of providing telecommunication services to a mobile-subscriber terminal roaming in a wireless telecommunication network, the method comprising:
registering a mobile subscriber terminal on a private wireless local area network;
identifying a public wireless network to which the mobile subscriber terminal subscribes, wherein the public wireless network and the private wireless local area network use different communications formats for communications with the mobile subscriber terminal;
retrieving roaming-agreement information from a roaming-agreement database, wherein the roaming-agreement information includes a routing protocol;
determining, based on the routing protocol, whether to route communications with the mobile subscriber terminal over the public-wireless network or over a transport network; and
providing communications services to the mobile-subscriber terminal in accordance with the roaming-agreement information.

* * * * *